United States Patent
Oota et al.

(10) Patent No.: US 10,421,449 B2
(45) Date of Patent: Sep. 24, 2019

(54) CONTROL DEVICE FOR VEHICLE AND CONTROL METHOD FOR VEHICLE

(71) Applicant: JATCO Ltd, Fuji-shi, Shizuoka (JP)

(72) Inventors: Yusuke Oota, Ebina (JP); Yoshimasa Nishihiro, Zama (JP); Masayoshi Nakasaki, Isehara (JP); Naoki Kobayashi, Hadano (JP)

(73) Assignee: JATCO LTD, Fuji-Shi (JP)

( * ) Notice: Subject to any disclaimer, the term of this patent is extended or adjusted under 35 U.S.C. 154(b) by 6 days.

(21) Appl. No.: 15/758,092

(22) PCT Filed: Sep. 27, 2016

(86) PCT No.: PCT/JP2016/078466
§ 371 (c)(1),
(2) Date: Mar. 7, 2018

(87) PCT Pub. No.: WO2017/057366
PCT Pub. Date: Apr. 6, 2017

(65) Prior Publication Data
US 2018/0244256 A1 Aug. 30, 2018

(30) Foreign Application Priority Data
Oct. 2, 2015 (JP) ................................. 2015-197041

(51) Int. Cl.
*F16H 63/50* (2006.01)
*B60W 10/06* (2006.01)
(Continued)

(52) U.S. Cl.
CPC ............ *B60W 10/06* (2013.01); *B60W 10/02* (2013.01); *B60W 10/107* (2013.01); *B60W 10/30* (2013.01); *B60W 30/18054* (2013.01); *B60W 30/18072* (2013.01); *F02D 29/02* (2013.01); *F16H 59/66* (2013.01); *F16H 61/02* (2013.01); *F16H 61/0213* (2013.01); *F16H 61/66* (2013.01); *F16H 63/50* (2013.01); *F16H 63/502* (2013.01); *B60W 2030/1809* (2013.01); *B60W 2050/0094* (2013.01); *B60W 2550/14* (2013.01);
(Continued)

(58) Field of Classification Search
None
See application file for complete search history.

(56) References Cited

U.S. PATENT DOCUMENTS

2015/0151761 A1 6/2015 Suzuki et al.
2016/0290503 A1* 10/2016 Kawamoto ....... F16H 61/66272
(Continued)

FOREIGN PATENT DOCUMENTS

JP 2010-209902 A 9/2010
JP 2013-213557 A 10/2013
(Continued)

*Primary Examiner* — Justin Holmes
(74) *Attorney, Agent, or Firm* — Foley & Lardner LLP

(57) ABSTRACT

A controller is a control device for a vehicle including an engine, an automatic transmission, and an oil pump and executes a sailing stop control that stops the engine and brings the automatic transmission into a neutral state when a sailing stop condition is satisfied. The controller cancels the sailing stop control to start the engine when a road inclination becomes larger than a predetermined value during the sailing stop control.

7 Claims, 3 Drawing Sheets

(51) Int. Cl.
  *B60W 10/107*   (2012.01)
  *F16H 61/02*    (2006.01)
  *F02D 29/02*    (2006.01)
  *F16H 61/66*    (2006.01)
  *B60W 10/30*    (2006.01)
  *B60W 30/18*    (2012.01)
  *F16H 59/66*    (2006.01)
  *B60W 10/02*    (2006.01)
  *B60W 50/00*    (2006.01)
  *F16H 59/18*    (2006.01)

(52) U.S. Cl.
  CPC . *B60W 2550/142* (2013.01); *B60W 2710/021* (2013.01); *B60W 2710/065* (2013.01); *B60W 2710/1005* (2013.01); *F16H 2059/186* (2013.01); *F16H 2059/663* (2013.01); *F16H 2312/20* (2013.01)

(56) References Cited

U.S. PATENT DOCUMENTS

2018/0245685 A1* 8/2018 Kawasumi ............. F16H 59/38
2018/0281799 A1* 10/2018 Kawamoto ......... B60W 10/026

FOREIGN PATENT DOCUMENTS

| JP | 2014-084905 A | 5/2014 |
| WO | WO 2015/068857 A1 | 5/2015 |
| WO | WO 2015/092518 A1 | 6/2015 |

* cited by examiner

CONTROL DEVICE FOR VEHICLE AND CONTROL METHOD FOR VEHICLE

TECHNICAL FIELD

The present invention relates to a control device for a vehicle and a control method for the vehicle.

BACKGROUND ART

JP2013-213557A discloses a technique corresponding to a sailing stop control which stops a driving source and brings an automatic transmission into a neutral state when a sailing stop condition is satisfied.

SUMMARY OF INVENTION

When a vehicle travels on an uphill road and similar road, it is preferred that a speed ratio of the automatic transmission is on a low side, that is, a large side. This is because the larger the speed ratio of the automatic transmission is, the larger a vehicle propulsion is obtained.

However, during the sailing stop control, in relation to performing freewheeling, a vehicle speed is at a medium-high speed, and the speed ratio of the automatic transmission is set to a high side, that is, a small side. During the sailing stop control, a driving source is stopped; therefore, a hydraulic pressure cannot be generated with an oil pump driven by a power of the driving source.

In view of this, when the sailing stop control is cancelled on the uphill road, it is possible to fail to ensure a hydraulic pressure sufficient for controlling the automatic transmission for a reacceleration, for example, a hydraulic pressure sufficient for a downshift of the automatic transmission and a clutch engagement of the automatic transmission. As a result, it is possible that the vehicle propulsion for the reacceleration becomes insufficient or a generation of the vehicle propulsion delays.

The present invention has been made in consideration of such problem. The object is to provide a control device for a vehicle and a control method for the vehicle configured to appropriately control the automatic transmission even when entering a steep road during a driving-source-stop-while-traveling control including a sailing stop control.

A control device for a vehicle according to a certain aspect of the present invention includes a first control unit and a second control unit. The vehicle includes a driving source, an automatic transmission coupled to the driving source, and an oil pump driven by a power of the driving source and constituting a hydraulic pressure source of a supplied hydraulic pressure to the automatic transmission. The first control unit is configured to execute a driving-source-stop-while-traveling control when a driving-source-stop-while-traveling condition is satisfied and the driving-source-stop-while-traveling control stops the driving source and brings the automatic transmission into a neutral state. The second control unit is configured to cancel the driving-source-stop-while-traveling control to start the driving source when a road inclination becomes larger than a predetermined value during the driving-source-stop-while-traveling control.

According to another aspect of the present invention, a control method for a vehicle is provided. The vehicle includes a driving source, an automatic transmission coupled to the driving source, and an oil pump driven by a power of the driving source and constituting a hydraulic pressure source of a supplied hydraulic pressure to the automatic transmission. The control method for the vehicle includes executing a driving-source-stop-while-traveling control when a driving-source-stop-while-traveling condition is satisfied and the driving-source-stop-while-traveling control stops the driving source and brings the automatic transmission into a neutral state. The control method for the vehicle also includes cancelling the driving-source-stop-while-traveling control to start the driving source when a road inclination becomes larger than a predetermined value during the driving-source-stop-while-traveling control.

With these aspects, before the road inclination becomes steep, the driving-source-stop-while-traveling control can be cancelled to start the driving source. In view of this, before the road inclination becomes steep, the hydraulic pressure sufficient for controlling the automatic transmission for the reacceleration can be ensured. Accordingly, even when entering the steep road during the driving-source-stop-while-traveling control, the automatic transmission can be appropriately controlled.

DESCRIPTION OF EMBODIMENTS

The following describes an embodiment of the present invention with reference to attached drawings.

Regarding states of a clutch, this description appropriately uses terms of disengage, standby, slip, and engage for the following meanings. Disengage means a state where no hydraulic pressure is supplied to the clutch and the clutch does not have a torque capacity. Standby means a state where the clutch does not have the torque capacity while the hydraulic pressure is supplied to the clutch. Slip means a state where the clutch has an input output rotation difference while the hydraulic pressure is supplied to the clutch and the clutch has the torque capacity. Engage means a state where the clutch has no input output rotation difference while the hydraulic pressure is supplied to the clutch and the clutch has the torque capacity.

The state where the clutch does not have the torque capacity is, in other words, a state where the clutch does not transmit a power, and the state where the clutch has the torque capacity is, in other words, a state where the clutch transmits the power. Slip is, in other words, a state where the clutch has the torque capacity smaller than an input torque, and engage means, in other words, a fully engaged state where the clutch has the torque capacity larger than the input torque.

Figure 1:
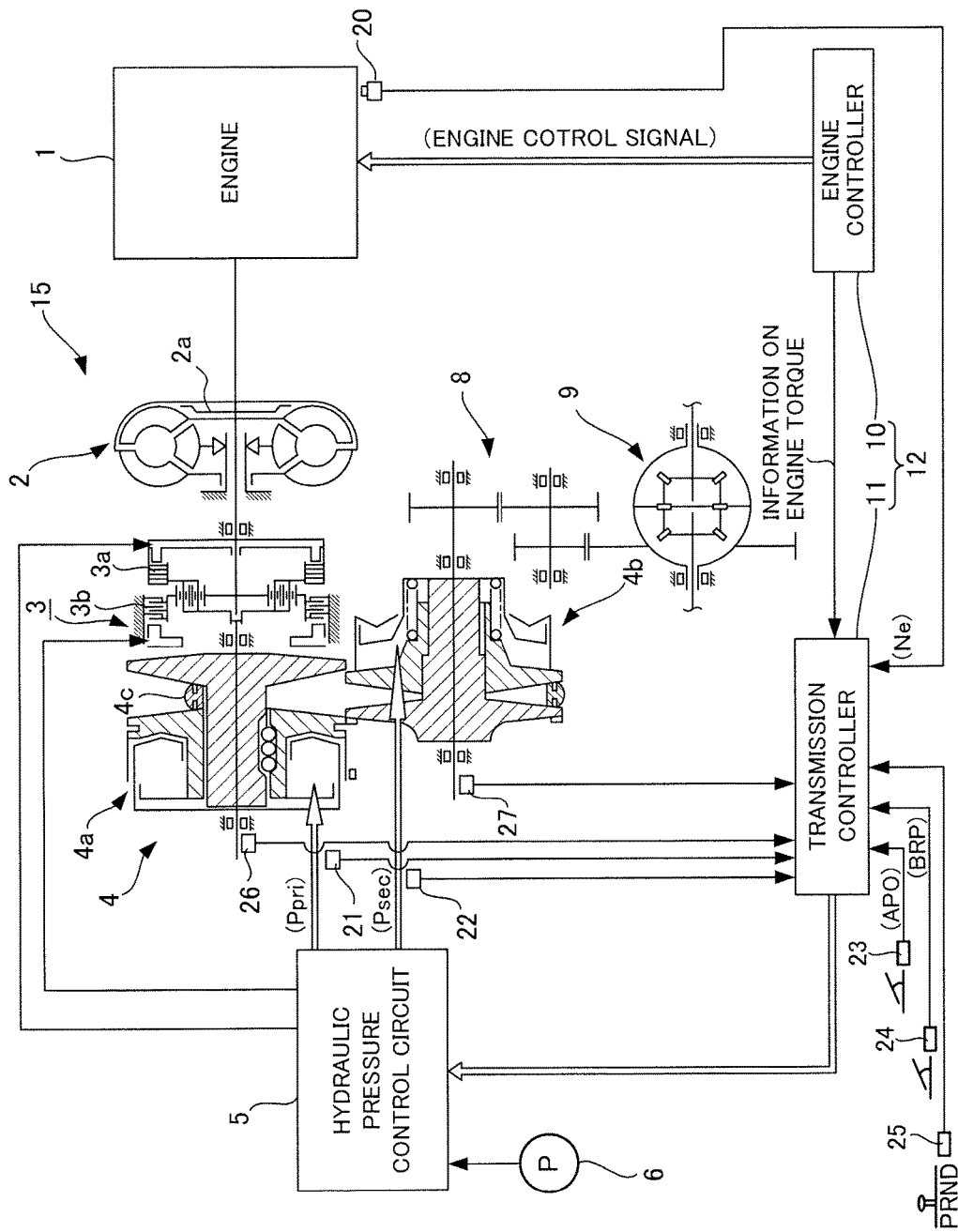
FIG. 1 is a schematic configuration diagram of a vehicle according to an embodiment.

FIG. 1 is a schematic configuration diagram of a vehicle according to the embodiment. The vehicle includes an engine 1, a torque converter 2, a forward/reverse switching mechanism 3, a continuously variable transmission 4, a hydraulic pressure control circuit 5, an oil pump 6, an engine controller 10, and a transmission controller 11. In the vehicle, a rotation generated by the engine 1 as a driving source is transmitted to a wheel (not illustrated) via the torque converter 2, the forward/reverse switching mechanism 3, the continuously variable transmission 4, a gear set 8, and a differential gear unit 9.

The torque converter 2 includes a lock-up clutch 2a. Engagement of the lock-up clutch 2a directly couples an input shaft to an output shaft of the torque converter 2 to cause the input shaft and the output shaft to rotate at an identical speed. Hereinafter, the lock-up clutch 2a is referred to as the LU clutch 2a.

The forward/reverse switching mechanism 3 includes a double pinion planetary gear set as a main component. Its sun gear is coupled to the engine 1 via the torque converter 2 and a carrier is coupled to a primary pulley 4a. The forward/reverse switching mechanism 3 further includes a forward clutch 3a that directly couples between the sun gear and the carrier of the double pinion planetary gear set and a backward brake 3b that secures a ring gear.

The forward/reverse switching mechanism 3 directly transmits an input rotation via the torque converter 2 from the engine 1 to the primary pulley 4a when the forward clutch 3a is engaged. The forward/reverse switching mechanism 3 transmits the input rotation via the torque converter 2 from the engine 1 to the primary pulley 4a under reversing and decelerating when the backward brake 3b is engaged. The forward clutch 3a constitutes a forward engaging element that connects/disconnects a transmission of the power from one to the other of the engine 1 and a driving wheel.

The continuously variable transmission 4 includes the primary pulley 4a, a secondary pulley 4b, and a belt 4c. In the continuously variable transmission 4, the hydraulic pressure supplied to the primary pulley 4a and the hydraulic pressure supplied to the secondary pulley 4b are controlled, thus changing a contact radius between each of the pulleys 4a and 4b and the belt 4c to shift the speed ratio.

The continuously variable transmission 4 is a variator. The continuously variable transmission 4 constitutes an automatic transmission 15, which is coupled to the engine 1, together with the torque converter 2 and the forward/reverse switching mechanism 3. The automatic transmission 15 may be indirectly coupled to the engine 1 via another structure. The forward/reverse switching mechanism 3 may, for example, be disposed between the continuously variable transmission 4 and the gear set 8.

The hydraulic pressure control circuit 5 is constituted of a plurality of flow passages and a plurality of hydraulic control valves. The hydraulic pressure control circuit 5 controls the plurality of hydraulic control valves to switch a supply passage of the hydraulic pressure on the basis of a shift control signal from the transmission controller 11 and adjusts a necessary hydraulic pressure from a hydraulic pressure generated by an oil discharged from the oil pump 6, and then supplies this to each site of the continuously variable transmission 4, the forward/reverse switching mechanism 3, and the torque converter 2.

The rotation of the engine 1 is input to the oil pump 6 to drive the oil pump 6 using a part of the power of the engine 1. The driving of the oil pump 6 supplies the oil discharged from the oil pump 6 to the hydraulic pressure control circuit 5. It should be noted that when the engine 1 is stopped, the oil pump 6 is not driven and the oil is not discharged. At this time, an electric oil pump is used. Both the oil pump 6 and the electric oil pump constitute a hydraulic pressure source of the supplied hydraulic pressure to the automatic transmission 15.

The transmission controller 11 is constituted of a CPU, a ROM, a RAM, and the like. In the transmission controller 11, the CPU reading and executing a program stored in the ROM provides a function of the transmission controller 11.

A signal from an engine rotation speed sensor 20 that detects a rotation speed Ne, a signal from a primary pulley pressure sensor 21 that detects a primary pulley pressure Ppri, a signal from a secondary pulley pressure sensor 22 that detects a secondary pulley pressure Psec, a signal from an accelerator position sensor 23 that detects an accelerator position APO, a signal from a brake sensor 24 that detects a brake pedal force based on a brake pedal depression amount BRP, a signal that relates to an engine torque Te from the engine controller 10 that manages to control the engine 1, and similar signal are input to the transmission controller 11.

Other than these, a signal from an inhibitor switch 25 that detects an operation position of a shift lever, a signal from a PRI rotational speed sensor 26 that detects a rotation speed Npri of the primary pulley 4a, a signal from a SEC rotational speed sensor 27 that detects a rotation speed Nsec of the secondary pulley 4b, and similar signal are input to the transmission controller 11. The transmission controller 11 can detect a vehicle speed Vsp on the basis of the signal from the SEC rotational speed sensor 27.

The transmission controller 11 constitutes a controller 12 with the engine controller 10. The controller 12 is constituted as a control module that controls the engine 1 and the automatic transmission 15.

In the vehicle, a sailing stop control is performed. Hereinafter, the sailing stop, which is an example of a driving-source-stop-while-traveling, is simply referred to as SS. An SS control stops the engine 1 and brings the automatic transmission 15 into a neutral state when an SS condition is satisfied. The SS control ensures an improvement of a fuel efficiency of the engine 1 by a stop of the engine 1 and an extended coasting distance.

The SS condition includes the vehicle speed Vsp being higher than a set vehicle speed, no pressing of an accelerator pedal, no pressing of a brake pedal, and a forward range being selected in the automatic transmission 15. The set vehicle speed is set so as to devide a low speed and a medium-high speed. The set vehicle speed can be preliminarily set, for example, by an experiment.

When the vehicle travels on the uphill road and similar road, the speed ratio of the automatic transmission 15 is preferred to be large. However, during the SS control, the vehicle speed Vsp is at the medium-high speed and corresponding to this, the speed ratio of the automatic transmission 15 is set to the high side. During the SS control, the engine 1 is stopped. Therefore, the hydraulic pressure cannot be generated with the oil pump 6.

In view of this, when the SS control is cancelled on the uphill road, it is concerned that the hydraulic pressure necessary for the downshift of the automatic transmission 15 and the engagement of the clutch of the automatic transmission 15 cannot be supplied. As a result, it is concerned that a vehicle propulsion for the reacceleration becomes insufficient and a generation of the vehicle propulsion delays.

In view of such circumstances, in this embodiment, the controller 12 performs a control as described below.

Figure 2:
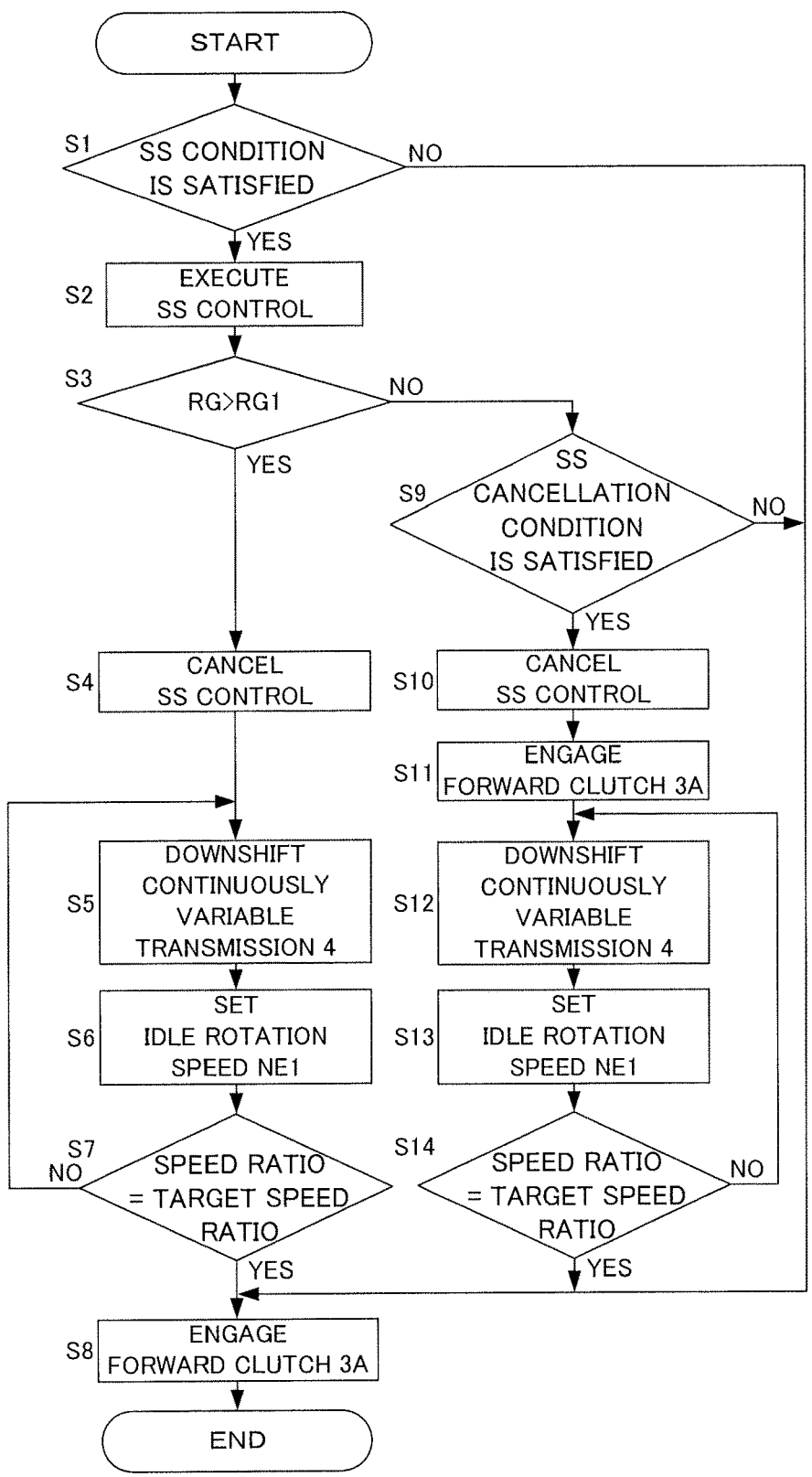
FIG. 2 is a drawing illustrating an exemplary control according to the embodiment with a flowchart.

FIG. 2 is a drawing illustrating an exemplary control performed by the controller 12 with a flowchart. The controller 12 performs a process in this flowchart when a road inclination RG is zero or more. The controller 12 may perform the process in this flowchart when the road inclination RG is larger than a value at which an acceleration occurs during the SS control. The controller 12 can repeatedly execute the process in this flowchart at every minute time.

At Step S1, the controller 12 determines whether the SS condition is satisfied or not. When a negative determination is made at Step S1, the process in this flowchart is once terminated. When a positive determination is made at Step S1, the process proceeds to Step S2.

At Step S2, the controller 12 executes the SS control. In view of this, at Step S2, the engine 1 is stopped and the automatic transmission 15 is brought into the neutral state. Specifically, the automatic transmission 15 is brought into the neutral state by disengaging the forward clutch 3a of the forward/reverse switching mechanism 3.

At Step S3, the controller 12 determines whether the road inclination RG is larger than a predetermined value RG1 or not. The determination at Step S3 is performed, when a deceleration is occurring, by determining whether a magnitude of the deceleration, that is, an absolute value is larger than a predetermined magnitude or not. The predetermined value RG1 can be, for example, a value of zero or more. The determination of the Step S3 may be determined by an appropriate technique including a publicly-known technique. When a positive determination is made at Step S3, the process proceeds to Step S4.

At Step S4, the controller 12 cancels the SS control. Accordingly, in this embodiment, one of SS cancellation conditions that cancel the SS control is that the road inclination RG is larger than the predetermined value RG1. At Step S4, cancelling the SS control starts the engine 1. As a result, the oil pump 6 also operates.

At Step S5, the controller 12 causes the continuously variable transmission 4 to downshift. Specifically, the controller 12 causes the continuously variable transmission 4 to downshift by controlling the speed ratio of the continuously variable transmission 4 to be a target speed ratio. The target speed ratio is set to be variable corresponding to the road inclination RG. Specifically, the larger the road inclination RG is, the larger the target speed ratio is set.

At Step S6, the controller 12 sets an idle rotation speed Ne1 of the engine 1. The idle rotation speed Ne1 is a rotation speed set for the engine 1 when there is no acceleration request for the engine 1. The controller 12 sets the idle rotation speed Ne1 to be variable on the basis of the speed ratio of the continuously variable transmission 4 before a start of downshifting and the target speed ratio. Specifically, the smaller a difference D between the speed ratio of the continuously variable transmission 4 before the start of downshifting and the target speed ratio is, the smaller the idle rotation speed Ne1 is set.

At Step S7, the controller 12 determines whether the speed ratio of the continuously variable transmission 4 is at the target speed ratio or not. When a negative determination is made at Step S7, the process returns to Step S5. This causes the downshift of the continuously variable transmission 4 to continue until the speed ratio of the continuously variable transmission 4 becomes the target speed ratio. When the speed ratio of the continuously variable transmission 4 becomes the target speed ratio, the downshifting of the continuously variable transmission 4 completes and a positive determination is made at Step S7. In this case, the process proceeds to Step S8.

At Step S8, the controller 12 engages the forward clutch 3a. Specifically, the controller 12 performs a synchronous control in addition to engaging the forward clutch 3a. The synchronous control synchronizes an input side rotation and an output side rotation of the forward clutch 3a. After Step S8, the process in this flowchart is once terminated.

When the negative determination is made at Step S3, the process proceeds to Step S9. At Step S9, the controller 12 determines whether the SS cancellation condition is satisfied or not. The SS cancellation condition is the unsatisfied SS condition. The SS cancellation condition further includes that the road inclination RG is larger than the predetermined value RG1.

At Step S9, the road inclination RG is equal to or less than the predetermined value RG1. Therefore, the unsatisfied SS condition satisfies the SS cancellation condition. When a negative determination is made at Step S9, the process is once terminated. When a positive determination is made at Step S9, the process proceeds to Step S10.

At Step S10, the controller 12 cancels the SS control. This starts the engine 1 and operates the oil pump 6. At Step S11, the controller 12 engages the forward clutch 3a. Specifically, the controller 12 performs the synchronous control in addition to engaging the forward clutch 3a similarly to Step S8.

At Step S12, the controller 12 causes the continuously variable transmission 4 to downshift similarly to Step S5. At Step S13, the controller 12 sets the idle rotation speed Ne1 of the engine 1 similarly to Step S6. At Step S14, the controller 12 determines whether the speed ratio of the continuously variable transmission 4 is at the target speed ratio or not. When the negative determination is made at Step S14, the process returns to Step S12. When the positive determination is made at Step S14, the process in this flowchart is once terminated.

When the negative determination is made at Step S3 and the positive determination is made at Step S9, the controller 12 performs the process at and after Step S12 following Step S11 to cause the continuously variable transmission 4 to downshift after the engagement of the forward clutch 3a, and then completes the downshift.

When completing the downshift of the continuously variable transmission 4 after the engagement of the forward clutch 3a, the controller 12 may start the downshift of the continuously variable transmission 4 during a period from a start of engaging the forward clutch 3a at Step S11 to a completion of engaging the forward clutch 3a.

The controller 12 is a control device of the vehicle. The controller 12 functions as a first control unit by performing the process at Step S2 and functions as a second control unit by performing the process from Step S4 to Step S8 and the process from Step S10 to Step S14. The controller 12 includes the first control unit and the second control unit by functioning as the first control unit and the second control unit. It may be regarded that the control device for the vehicle is constituted by further including the hydraulic pressure control circuit 5 and various kinds of sensors and switches described above, such as the engine rotation speed sensor 20.

Next, a main operational effect of the controller 12 will be described.

Figure 3:
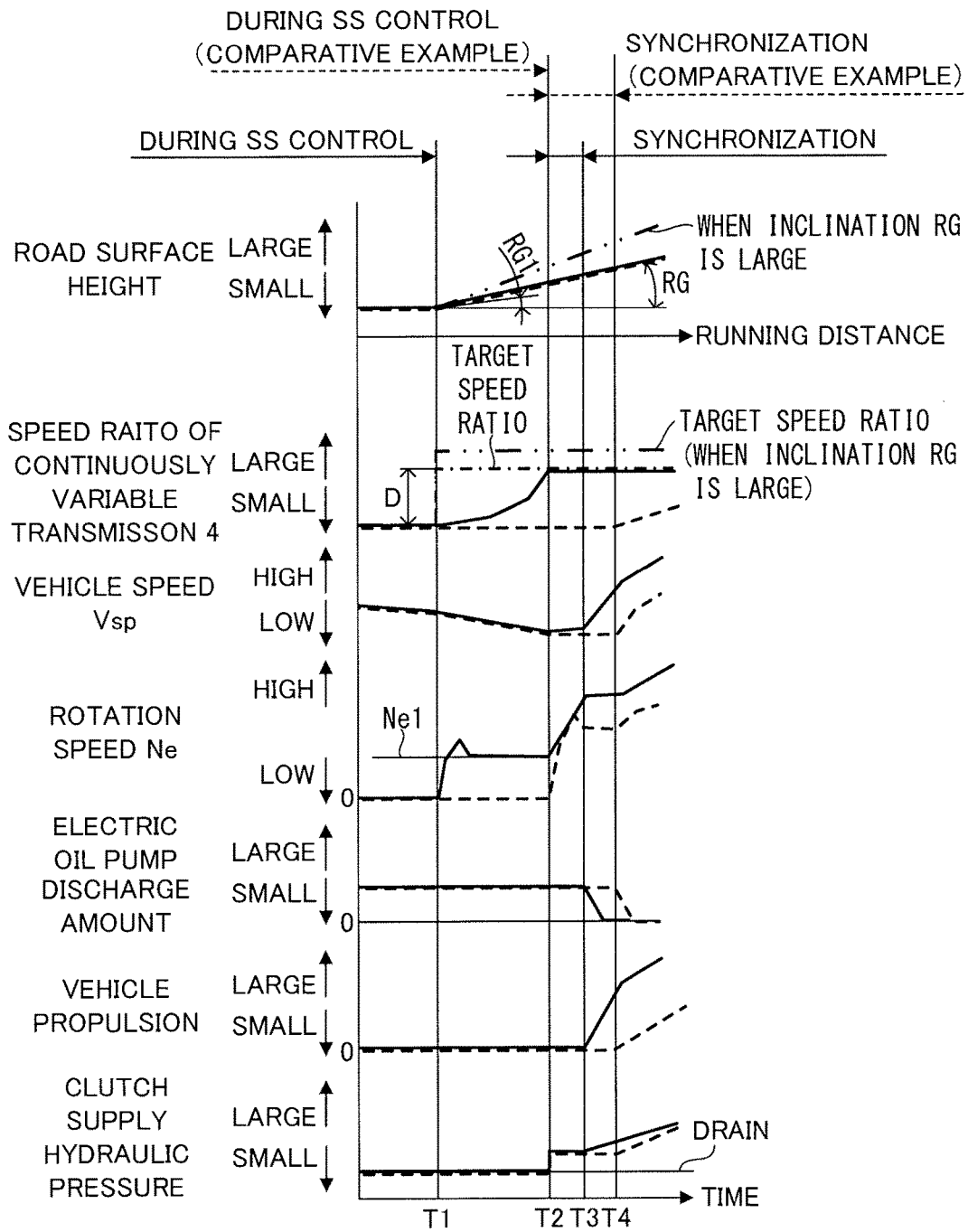
FIG. 3 is a drawing illustrating an exemplary timing chart corresponding to a control according to the embodiment.

FIG. 3 is a drawing illustrating an exemplary timing chart corresponding to the control performed by the controller 12. In FIG. 3, for parameters other than a road surface height, time is indicated for horizontal axes. For the road surface height, a running distance corresponding to time is indicated for a horizontal axis in order to illustrate the road inclination RG. In FIG. 3, dashed lines are also illustrated for the case of a comparative example.

Before a time point T1, the SS control is being performed. In view of this, the rotation speed Ne is zero and a clutch supply hydraulic pressure, which is a supplied hydraulic pressure to the forward clutch 3a, is drained. Accordingly, the forward clutch 3a is disengaged. The vehicle propulsion is zero, and the speed ratio of the continuously variable transmission 4 is set to the high side, that is, the small side. During the SS control, the speed ratio is, for example, set to a minimum speed ratio. The road inclination RG is zero, and the vehicle speed Vsp gradually decreases. During the SS control, the electric oil pump supplies the necessary hydraulic pressure.

At the time point T1, the road inclination RG becomes larger than the predetermined value RG1. In view of this, at the time point T1, the SS control is cancelled, and the engine 1 starts. As a result, the rotation speed Ne becomes the idle rotation speed Ne1. The oil pump 6 operates to enable a hydraulic pressure supply by the oil pump 6.

At the time point T1, the target speed ratio of the continuously variable transmission 4 is changed. The target speed ratio is set to larger than that before the time point T1. In view of this, at the time point T1, the downshift of the continuously variable transmission 4 is started. As indicated by a two-dot chain line, the larger the road inclination RG is, the larger the target speed ratio is set.

When the downshift of the continuously variable transmission 4 is performed, the idle rotation speed Ne1 is set. The smaller the difference D between the speed ratio of the continuously variable transmission 4 before the start of the downshift and the target speed ratio is, the smaller the idle rotation speed Ne1 is set.

At a time point T2, the speed ratio of the continuously variable transmission 4 becomes the target speed ratio, and the downshift completes. In view of this, at the time point T2, the clutch supply hydraulic pressure is increased, and the forward clutch 3a is engaged. From the time point T2, the synchronous control is started, and the rotation speed Ne increases.

At a time point T3, the synchronous control is completed. At the time point T3, corresponding to a completion of the synchronous control, the vehicle speed Vsp and the vehicle propulsion starts to increase. A discharge amount of electric oil pump starts to decrease by a stop command.

In the case of the comparative example, the SS control is not cancelled even when the road inclination RG becomes larger than the predetermined value RG1 at the time point T1. In view of this, the engine 1 is not started at the time point T1, and the rotation speed Ne does not increase. In the case of the comparative example, the SS cancellation condition is satisfied at the time point T2. As a result, the engine 1 starts and the oil pump 6 operates at the time point T2. In response to the operation of the oil pump 6, the engagement of the forward clutch 3a and the synchronous control are started.

However, in the case of the comparative example, at a time point T3 just after the time point T2 when the engine 1 is started, the hydraulic pressure sufficient for engaging the forward clutch 3a cannot be generated with the oil pump 6. As a result, the completion of the synchronous control is delayed to a time point T4.

In the case of the comparative example, even the hydraulic pressure sufficient for shifting of the continuously variable transmission 4 cannot be obtained until the time point T4. In view of this, the speed ratio of the continuously variable transmission 4 is continuously small until the time point T4. Therefore, a large vehicle propulsion cannot be obtained even though an acceleration is performed from the time point T4.

In view of such circumstances, the controller 12 as the control device for the vehicle including the engine 1, the automatic transmission 15, and the oil pump 6 executes the SS control that stops the engine 1 and brings the automatic transmission 15 into the neutral state when the SS condition is satisfied. The controller 12 cancels the SS control to start the engine 1 when the road inclination RG becomes larger than the predetermined value RG1 during the SS control.

The controller 12 having such a configuration ensures cancelling the SS control to start the engine 1 before the road inclination RG becomes steep. In view of this, the hydraulic pressure sufficient for controlling the automatic transmission 15 for the reacceleration can be ensured before the road inclination RG becomes steep. Accordingly, even when entering a steep road during the SS control, the automatic transmission 15 can be appropriately controlled.

In this embodiment, the automatic transmission 15 has a configuration including the continuously variable transmission 4, and the controller 12 cancels the SS control to start the engine 1 and causes the continuously variable transmission 4 to downshift when the road inclination RG becomes larger than the predetermined value RG1.

The controller 12 having such a configuration ensures causing the continuously variable transmission 4 to downshift before the road inclination RG becomes steep, thereby ensuring a quick generation of the vehicle propulsion for the reacceleration. The driving of the engine 1 ensures generating the hydraulic pressure sufficient for causing the continuously variable transmission 4 to downshift.

In this embodiment, the automatic transmission 15 has a configuration further including the forward clutch 3a, and the controller 12 engages the forward clutch 3a after the downshift of the continuously variable transmission 4 is completed.

The controller 12 having such a configuration ensures obtaining a sufficient acceleration during the reacceleration since the downshift of the continuously variable transmission 4 is completed when the forward clutch 3a is engaged.

The controller 12 cancels the SS control to start the engine 1 and engage the forward clutch 3a, and completes the downshift of the continuously variable transmission 4 after the engagement of the forward clutch 3a in a case where the SS cancellation condition is satisfied when the road inclination RG is smaller than the predetermined value RG1.

The road inclination RG when the SS cancellation condition is satisfied may be a positive inclination smaller than the predetermined value RG1 or an inclination smaller than the predetermined value RG1 and larger than a value at which the acceleration occurs during the SS control. A positive lower limit value may be set for the road inclination RG when the SS cancellation condition is satisfied.

The controller 12 having such a configuration ensures performing the synchronous control in a state where the speed ratio of the continuously variable transmission 4 is smaller than that when the downshift is completed in a case where the vehicle does not rapidly decelerate due to the road inclination RG. Accordingly, the rotation speed Ne for the synchronization requires less than that when the downshift is completed, and the synchronous control can be performed with a shortened period to increase the input side rotation speed of the forward clutch 3a, thereby ensuring a shortened period for the synchronization.

In this embodiment, the target speed ratio when the continuously variable transmission 4 downshifts is set to be variable corresponding to the road inclination RG. This ensures a shortened period for the downshift when the road inclination RG is small by, for example, setting the target speed ratio small when the road inclination RG is small. It is possible to obtain the large vehicle propulsion when the road inclination RG is large.

In this embodiment, the idle rotation speed Ne1 is set to be variable on the basis of the difference D between the speed ratio of the continuously variable transmission 4 before the start of the downshift and the target speed ratio when the continuously variable transmission 4 downshifts. This ensures achieving an improved fuel efficiency while ensuring the necessary hydraulic pressure by, for example, setting the idle rotation speed Ne1 small when the difference D is small.

The embodiment of the present invention described above is merely illustration of a part of application example of the present invention and not of the nature to limit the technical scope of the present invention to the specific constructions of the above embodiment.

The above-described embodiment has described the case where the SS is the driving-source-stop-while-traveling. However, the driving-source-stop-while-traveling may be, for example, a coast stop. Specifically speaking, the controller 12 may perform, instead of the SS control, for example, a coast stop control that is executed when a follow coast stop condition is satisfied and cancelled when a follow coast stop cancellation condition is satisfied.

The coast stop condition includes the vehicle speed Vsp being less than a predetermined vehicle speed, no pressing of the accelerator pedal, pressing of the brake pedal, and the forward range being selected in the automatic transmission 15. The predetermined vehicle speed is, for example, a vehicle speed at which the lock-up clutch 2a is disengaged. The coast stop cancellation condition is, for example, unsatisfaction of any of these constituent conditions that constitute the coast stop condition.

The above-described embodiment has described the case where the automatic transmission 15 is configured by including the continuously variable transmission 4. However, the automatic transmission 15 may be configured by including, for example, a stepped automatic transmission, that is, what is called, an automatic transmission. The continuously variable transmission 4 may be, for example, a toroidal continuously variable transmission instead of a belt-type continuously variable transmission.

The above-described embodiment has described the case where the automatic transmission 15 includes the forward clutch 3a of the forward/reverse switching mechanism 3 as a forward engaging element. However, the automatic transmission 15 may be configured, for example, by including a sub-transmission mechanism and a forward engaging element of the sub-transmission mechanism as the forward engaging element.

The above-described embodiment has described the case where the engine 1 is the driving source. However, the driving source may be, for example, a motor or a motor and the engine 1.

The above-described embodiment has described the case where the controller 12 is configured by the engine controller 10 and the transmission controller 11. However, the controller 12 may be configured by further including another controller or may be a single controller.

The present application claims a priority based on Japanese Patent Application No. 2015-197041 filed with the Japan Patent Office on Oct. 2, 2015, all the contents of which are hereby incorporated by reference.

The invention claimed is:

1. A control device for a vehicle including a driving source, an automatic transmission coupled to the driving source and including a variator, and an oil pump driven by a power of the driving source and constituting a hydraulic pressure source of a supplied hydraulic pressure to the automatic transmission, the control device for the vehicle comprising:
a controller configured to:
execute a driving-source-stop-while-traveling control when a driving-source-stop-while-traveling condition is satisfied, the driving-source-stop-while-traveling control stopping the driving source and bringing the automatic transmission into a neutral state; and
cancel the driving-source-stop-while-traveling control to start the driving source and cause the variator to downshift when a road inclination becomes larger than a predetermined value during the driving-source-stop-while-traveling control.

2. The control device for the vehicle according to claim 1, wherein
the automatic transmission further includes a forward engaging element, and
the controller engages the forward engaging element after the downshift of the variator is completed.

3. The control device for the vehicle according to claim 2, wherein
the controller cancels the driving-source-stop-while-traveling control to start the driving source and engages the forward engaging element to complete the downshift of the variator after the engagement of the forward engaging element in a case where a driving-source-stop-while-traveling cancellation condition is satisfied when a road inclination is smaller than the predetermined value.

4. The control device for the vehicle according to claim 1, wherein
the variator has a target speed ratio at a time of downshifting, the target speed ratio being set to be variable corresponding to a road inclination.

5. The control device for the vehicle according to claim 4, wherein
when the downshift of the variator is performed, an idle rotation speed as a rotation speed set for the driving source when the driving source is not requested to accelerate is set to be variable on the basis of a difference between a speed ratio of the variator before the start of the downshift and the target speed ratio.

6. A control method for a vehicle including a driving source, an automatic transmission coupled to the driving source and including a variator, and an oil pump driven by a power of the driving source and constituting a hydraulic pressure source of a supplied hydraulic pressure to the automatic transmission, the control method for the vehicle comprising:
executing a driving-source-stop-while-traveling control when a driving-source-stop-while-traveling condition is satisfied, the driving-source-stop-while-traveling control stopping the driving source and bringing the automatic transmission into a neutral state; and
cancelling the driving-source-stop-while-traveling control to start the driving source and causing the variator to downshift when a road inclination becomes larger than a predetermined value during the driving-source-stop-while-traveling control.

7. A control device for a vehicle including a driving source, an automatic transmission coupled to the driving source and including a variator, and an oil pump driven by a power of the driving source and constituting a hydraulic pressure source of a supplied hydraulic pressure to the automatic transmission, the control device for the vehicle comprising:
first control means for executing a driving-source-stop-while-traveling control when a driving-source-stop-while-traveling condition is satisfied, the driving-source-stop-while-traveling control stopping the driving source and bringing the automatic transmission into a neutral state; and second control means for cancelling the driving-source-stop-while-traveling control to start the driving source and causing the variator to downshift when a road inclination becomes larger than a predetermined value during the driving-source-stop-while-traveling control.

* * * * *